United States Patent Office 3,424,592
Patented Jan. 28, 1969

3,424,592
PROCESS FOR PREPARING A FRIED ONION FLAVORING
Heinz Huth, Holzminden, Germany, assignor to Dragoco Gerberding & Co. G.m.b.H., Holzminden, Weser, Germany, a corporation of Germany
No Drawing. Filed Oct. 9, 1964, Ser. No. 402,926
Claims priority, application Germany, Oct. 12, 1963, D 42,698
U.S. Cl. 99—140  5 Claims
Int. Cl. A21l 1/26

ABSTRACT OF THE DISCLOSURE

Prepare an emulsion of onion juice, nutritive oil and a fat emulsifier and heat said emulsion in a closed vessel to produce a fried onion flavor.

The present invention relates to a process for the preparation of food flavoring compositions and more particularly to a process for the preparation of a composition having, and imparting to food, the natural, highly concentrated flavor and aroma of fried onions, and to such compositions.

It is known to prepare fried onions industrially and in the kitchen by cutting fresh, peeled onions to small pieces and browning those pieces by heating them in salad-oil or fat for cooking. The resulting pieces of fried onions are then added to the food, in most cases together with the fat.

However, this process has the disadvantage that the flavoring compounds formed on heating adhere to a large extent to the solid onion pieces which are insoluble in the food. Therefore, uniform distribution of the flavoring agents throughout the food is impossible.

Furthermore, when preparing fried onions in the kitchen, a considerable amount of the resulting flavoring substances escapes and vaporizes during the process. Therefore, it is necessary to add large amounts of fried onions to the food to impart thereto the desired taste and flavor of fried onions.

Moreover, this process has the disadvantage that non-uniformly fried onion pieces are obtained. Often the fat used for frying the onions is overheated whereby polymerization products of the fats are formed which have been found to be toxic.

In addition thereto the known process requires considerable work and is extremely troublesome due to irritation of the sense organs and the mucous membranes. Admixing the proper amounts of pieces of fried onions is inaccurate and complicated in the industrial preparation of food.

It is one object of the present invention to provide a composition having the flavor and aroma of fried onions which composition is free of the disadvantages of the heretofore used pieces of fried onions and which has proved to be highly useful in imparting to food the flavor, taste, and aroma of fried onions.

Another object of the present invention is to provide a composition which contains the natural flavor and aroma of fried onions in concentrated form.

Still another object of the present invention is to provide a simple and effective process of preparing such a composition containing the natural flavor, taste, and aroma of fried onions in concentrated form and which is free of the disadvantages of the known processes.

These and other objects of the present invention and advantageous features thereof will become more apparent as the description proceeds.

In principle the process according to the present invention consists in preparing an emulsion of, preferably concentrated, onion juice, a nutritive and preferably a vegetable oil or fat, and a physiologically harmless fat emulsifier and heating said emulsion in a closed vessel at a temperature between about 100° C. and preferably about 110° C. and about 150° C. until the characteristic flavor, taste, and aroma of fried onions is produced.

The starting onion juice is prepared by pressing freshly peeled onions and separating the juice by centrifuging from coarser cell particles. To obtain an onion juice which is stable and resistant to microbes without the addition of chemical preserving agents, the water is removed from said juice by concentrating in a vacuum evaporator at a temperature as low as possible until the soluble solids content is about 78%. The preferred evaporator used for concentrating the onion juice is a continuous thin-layer low-temperature evaporator as it is conventionally used for concentrating fruit juices.

The aromatic substances of raw onions which are evaporated during this concentration process, are recovered from the condensed vapors in a separate and surface condenser cooled with water to about 12° C. They are extracted from the condensed liquid, for instance, by means of methylene chloride which is distilled off from the extract by vacuum distillation. The resulting flavoring and aromatic substances are concentrated in a rectifying apparatus. The concentrate is then added to the concentrated onion juice before emulsifying the same. The concentrated onion juice is relatively viscous and, therefore, facilitates formation of the emulsion which will be described hereinafter.

To produce the flavor, taste, and aroma of fried onions, the concentrated onion juice is emulsified in preferably refined vegetable oil of neutral, indifferent taste, preferably in soybean oil, cotton seed oil, corn germ oil, and the like, by means of a physiologically indifferent fat emulsifier.

All fat emulsifiers as they are used in the food industry which are oil soluble and are capable of producing oil-in-water emulsions may be used for this purpose. Such emulsifiers are, for instance, soybean lecithin, glycerol mono-stearate, glycerol mono-oleate, propylene glycol monostearate, polyoxyethylene sorbitan mono-oleate, polyoxyethylene sorbitan tristearate, and the like.

According to the contemplated use an emulsion of the oil-in-water type is the preferred emulsion as it can readily be diluted with water. However, water-in-oil emulsions may also be prepared.

Emulsification is effected by dissolving the fat emulsifier in the vegetable oil heated to a temperature not substantially exceeding 80° C. The concentrated onion juice is heated to about the same temperature. Both solutions are combined with the exclusion of air while stirring vigorously. The combined mixture is then emulsified in an emulsifying apparatus preferably in a vacuum. The preferred dissolving, mixing and emulsifying temperature is about 50° C. to 52° C. because formation of the emulsion is facilitated and accelerated at such a temperature.

All emulsifying apparatus which cause finest dispersion of the oil in the aqueous onion juice without excessive aeration can be used for this purpose. Especially suitable are high pressure homogenizers or continuous ultra-sound apparatus operating according to the principle of the vibrating blade.

To develop the characteristic flavor, taste, and aroma of fried onions, the emulsion is then heated in a closed vessel to a temperature starting at about 100° C. preferably between about 110° C. and about 150° C. while stirring. A temperature of about 150° C. should not substantially be exceeded.

Heating of the onion particles in intimate contact with the fat particles causes formation of the flavor and aroma of fried onions in concentrated form under exactly controlled temperatures which do not affect the fat. Thus, formation of toxic fat products is avoided since local overheating of the fat does not take place.

An important factor in the production of satisfactory flavoring products is the proper heating duration. The higher the temperature, the shorter is the required duration of heating. For instance, good results are achieved at 115° C. when heating the emulsion for about 40 minutes, at 125° C. for about 20 minutes, and at 140° C. for about 5 minutes. Optimum temperature and duration are determined by taste tests. The organoleptically best flavor, taste, and aroma are achieved by heating the onion juice-fat emulsion at about 130° C. for 20 minutes.

The degree of browning of the resulting product and its fluidity and viscosity may also be used for determining optimum temperature and duration. Browning increases with increasing duration of heating at a specific temperature. At the same time the viscosity decreases. A viscosity of about 40,000 centipoises determined at 20° C. indicates a product of highly satisfactory flavor, taste, and aroma. In addition thereto products of such a viscosity are highly stable on storage. An emulsion produced in this manner can be stored at 4° C. for many months without any separation of oil. When packed in hermetically sealed bags and the like containers, the flavor, taste, and aroma is not disadvantageously affected even on storage for more than 12 months at 4° C.

It may be mentioned that no deemulsification takes place provided heating is effected at a temperature between about 110° C. and about 150° C. for a period of time sufficient to produce the desired flavor, taste, and aroma of fried onions and if the emulsion is stirred thereby. No other precautionary measures need be taken to maintain the emulsion.

The product prepared according to the process of the present invention is preferably in such a concentrated state that it can still be poured, i.e., that it is still fluid. It contains the typical flavor, taste, and aroma of fried onions. To impart to food a distinct fried onion flavor, about 1 kg. of the heated concentrated emulsion is sufficient for 1,000 kg. of food.

It can readily be added to the food because dilution by simple stirring with water is possible. This facilitates addition of the proper amount of the flavoring composition and assures their homogenous distribution throughout the food. The fried onion flavor and taste remains stable and unspoiled, even on prolonged storage, without the addition of chemical preserving agents. Due to the high concentration of the flavoring components in compositions according to the present invention, it is readily possible to impart fried onion flavor and taste also to concentrated intermediate and half-finished products of the food industry.

Examples of such concentrated products are, for instance, mixtures of the fried onion emulsions according to the present invention with spice extracts with or without the addition of ethereal oils obtained from such spices, or, respectively, concentrated soup and gravy preparations such as mixtures of said fried onion emulsions with concentrated protein or yeast hydrolysates, fat, spices or spice essences, and sodium chloride.

The following example serves to illustrate the present invention without, however, limiting the same thereto.

EXAMPLE 0.35 kg. of the fat emulsifier, sold under the trademark "Imwitor 900" by Chemische Werke Witten of Witten/Ruhr, Germany, which is a partially esterified glyceride mixture of saturated fatty acids derived from vegetable oils and having a mono-ester content of about 45%, is dissolved in 34.65 kg. of soybean oil, heated to 80° C. 65.0 kg. of refractometrically determined concentrated onion juice with a solids content of 76% are also heated to 80° C. The oil is intimately mixed with the concentrated onion juice by stirring in a vacuum. The resulting homogeneous mixture is then emulsified in an emulsifier under vacuum, thereby achieving very fine and uniform dispersion of the oil in the juice concentrate. The emulsion is passed into an autoclave heated to 130° C. while stirring, kept at said temperature for 20 minutes, and immediately cooled.

An even more finely dispersed emulsion is obtained when preheating the solution of vegetable oil and emulsifier as well as the onion juice concentrate to 50–52° C. and producing the oil-in-water emulsion also at said temperature.

For certain uses in the food industry, pulverulent fried onion flavoring compositions are preferred to the above described fluid product. Such particulate fried onion flavoring compositions can be prepared from the fluid concentrates by means of the known drying processes, especially vacuum drying, spray drying, or freeze drying whereby a freely flowing powder is obtained. The oil droplets of the oil-in-water emulsion are surrounded and encapsulated by the solid matter of the onion juice concentrate during said drying process so that pulverulent products of excellent stability result.

Of course, many changes and variations in the starting materials, the onion juice, vegetable or other nutritive oil or fat, and emulsifier, in the concentration of the onion juice, in the manner of emulsifying the mixture of onion juice, oil or fat, and emulsifier, in the temperature, duration and other emulsifying and heating conditions, in the manner in which the resulting heated emulsion is worked up and used in the food industry and the preparation of food, and the like may be made by those skilled in this art in accordance with the principles set forth herein and in the claims annexed hereto.

I claim:

1. In a process of preparing a composition for imparting fried onion flavor, taste, and aroma to food, the steps which comprise preparing an emulsion of onion juice, a nutritive oil, and a physiologically indifferent fat emulsifier and heating said emulsion in a closed vessel at a temperature between about 100° C. and about 150° C. until the desired fried onion flavor is produced.

2. In a process of preparing a composition for imparting fried onion flavor, taste, and aroma to food, the steps which comprise dissolving a fat emulsifier in a heated vegetable oil, mixing said solution with a heated onion juice at about the same temperature, emulsifying said mixture at said temperature, heating the resulting emulsion in a closed vessel at a temperature between about 100° C. and about 150° C. until the desired fried onion flavor is produced, and rapidly cooling the heated emulsion.

3. The process according to claim 2, wherein the emulsifier-oil solution and the onion juice are heated to a temperature not substantially exceeding 80° C. before mixing and emulsifying.

4. In a process of preparing a composition for imparting fried onion flavor, taste, and aroma to food, the steps which comprise preparing an emulsion of onion juice, a nutritive oil, and a physiologically indifferent fat emulsifier and heating said emulsion in a closed vessel at a temperature between about 115° C. and about 140° C. for a period of time between about 40 minutes at said lower temperature and about 5 minutes at said higher temperature until the desired fried onion flavor is produced.

5. In a process of preparing a composition for imparting fried onion flavor, taste, and aroma to food, the steps which comprise dissolving a fat emulsifier in a heated vegetable oil, mixing said solution with a heated onion juice at a temperature of 50–52° C., and heating the resulting emulsion in a closed vessel at a temperature between about 110° C. and about 150° C. until the desired fried onion flavor is produced.

References Cited

UNITED STATES PATENTS

| | | | |
|---|---|---|---|
| 1,462,163 | 7/1923 | Braff | 99—118 |
| 1,619,826 | 3/1927 | Marx | 99—205 |
| 2,246,528 | 6/1941 | Musher | 99—140 |
| 3,071,475 | 1/1963 | Stohr | 99—118 |

FOREIGN PATENTS 883,172  6/1943  France.

OTHER REFERENCES

"Ida Bailey Allen's Modern Cook Book," 1935, Garden City Publishing Co., Inc., Garden City, N.Y., p. 266.

Chipault et al.: "Antioxidant Properties of Spices in Oil-In-Water Emulsions," Food Research, vol. 20, No. 5 (Sept.–Oct. 1955), pp. 443–448 (p. 444 relied on).

Rombauer et al.: "The Joy of Cooking," 1953, The Bobbs-Merill Co., Inc., New York, N.Y., p. 294.

Merory, Food Flavorings, Avi Publishing Co., Inc., Westport, Conn., 1960, p. 240.

A. LOUIS MONACELL, *Primary Examiner*.

H. H. KLARE III, *Assistant Examiner*.

U.S. Cl. X.R.

99—123